(12) United States Patent
Stockmann

(10) Patent No.: US 12,378,640 B2
(45) Date of Patent: Aug. 5, 2025

(54) COMPOSITION AND METHOD OR RECOVERING RARE-EARTH ELEMENTS

(71) Applicant: Bradley Stockmann, St. Louis, MO (US)

(72) Inventor: Bradley Stockmann, St. Louis, MO (US)

( * ) Notice: Subject to any disclaimer, the term of this patent is extended or adjusted under 35 U.S.C. 154(b) by 897 days.

(21) Appl. No.: 17/498,597

(22) Filed: Oct. 11, 2021

(65) Prior Publication Data

US 2022/0112577 A1    Apr. 14, 2022

Related U.S. Application Data

(60) Provisional application No. 63/090,605, filed on Oct. 12, 2020.

(51) Int. Cl.
*C22B 59/00*  (2006.01)
*C22B 3/26*  (2006.01)
*C22B 7/00*  (2006.01)

(52) U.S. Cl.
CPC .............. *C22B 59/00* (2013.01); *C22B 3/306* (2021.05); *C22B 7/007* (2013.01)

(58) Field of Classification Search
CPC .......... C22B 59/00; C22B 3/306; C22B 7/007
See application file for complete search history.

(56) References Cited

PUBLICATIONS

Gadavist (gadobutrol) injection, FDA (2011).*
Naghizadeh et al., Envir. Nanotechnology monitoring & Management, (2019), v. 12, 100250.*

* cited by examiner

*Primary Examiner* — Yong L Chu
(74) *Attorney, Agent, or Firm* — Joseph E. Zahner

(57) ABSTRACT

Disclosed is a method for recycling metal-chelates by separating the metal or metal ion from the chelate by forming a metal salt or metal precipitate apart from the chelator. In various embodiments, gadolinium-chelates, which are used as MRI contrast agent and which create vial hold-up material that is otherwise discarded, are acid or solvent treated to promote separation of the gadolinium from the chelate for downstream sale or further processing.

15 Claims, 12 Drawing Sheets

COMPOSITION AND METHOD OR RECOVERING RARE-EARTH ELEMENTS

CROSS REFERENCE TO RELATE APPLICATIONS

This application claims priority to U.S. Provisional Application No. 63/090,605, which was filed on Oct. 12, 2020, and which is herein incorporated in its entirety by reference.

BACKGROUND

Field

The invention is generally directed to the field of recycling and reclaiming post-consumer rare-earth metals. The specifically provides for the purification for removal from waste streams and subsequent re-use of rare-earth metals used as contrast agents.

Summary of the Related Art

Gadolinium contrast media (sometimes called an MRI contrast media, agents or 'dyes') are chemical substances used in magnetic resonance imaging (MRI) scans. When injected into the body, gadolinium contrast medium enhances and improves the quality of the MRI images (or pictures). This allows the radiologist (a specialist doctor trained to examine the images and provide a written report to your doctor or specialist) to more accurately report on how your body is working and whether there is any disease or abnormality present.

Gadolinium contrast media consist of complex compounds, arrangements of atoms held together by chemical bonds. The chemical bonds are made between a gadolinium ion and a carrier compound (a chelating agent). A chelating agent reduces the toxicity of gadolinium while maintaining its contrast properties. Different brands of gadolinium contrast medium use different chelating compounds. The contrast medium is injected intravenously (into a vein) as part of an MRI scan, and eliminated from the body through the kidneys.

Problem

Rare-earth contrasting agents are generally administered from glass vials containing a nominal volume of contrasting agent. Due to container hold-up, administration requirements based upon patient size, and other reasons, a significant amount of contrasting agent remains in the container and is discarded. This creates increased costs and problems associated with biological and chemical waste disposal, loss of valuable product, as well as environmental waste problems.

Solution

Disclosed is a method to recover, extract, and purify rare-earth elements from expired and/or unused portions of contrast agents. The recovered, extracted, and purified rare-earth elements can be used for other uses and otherwise placed into the stream of commerce. The disclosed method reduces the creation of pollution and the depositing of valuable rare-earth elements into the waste stream.

SUMMARY

In a first aspect, the invention provides a method of purifying a rare-earth element by pooling residual amounts of a rare-earth solution from two or more containers and then extracting the rare-earth element or compound form the pooled solution. In one embodiment, the rare-earth solution is a medical-use contrasting agent or a contrasting agent useful for magnetic resonance imaging.

In one embodiment, the rare-earth element is gadolinium, yttrium, samarium, thulium, or lutetium. In one embodiment, the rare-earth element is complexed with a chelator. In a preferred embodiment, the rare-earth element is gadolinium, which may comprise a compound or be complexed with a chelator.

In one embodiment, the container that contains the rare-earth solution is a plastic bottle, plastic vial, glass bottle, glass vial, a glass syringe, or a plastic syringe.

In one embodiment, the extraction step includes forming a salt of the rare-earth metal, precipitating the salt of the rare-earth metal from solution, and isolating the precipitate by reducing the pH of the rare-earth solution to a pH<1. In one embodiment, the precipitate is isolated by filtering the precipitated solution and retaining the filtrate.

In another embodiment, the extraction step includes ion exchange. In one embodiment, the ion exchange step includes elution chromatography, displacement chromatography, or selective elution chromatography.

In one embodiment, the extraction step includes repeated fractional crystallization.

In one embodiment, the extraction step includes solvent extraction.

In a second aspect, the invention provides a purified rare-earth element or purified compound containing a rare-earth produced by a method of the first aspect. In one embodiment, the purified rare-earth element or the purified compound containing a rare-earth atom represents at least 95% of the elemental or molecular species in a composition.

In one embodiment, the rare-earth element is gadolinium. In one embodiment, the molecular species is a gadolinium compound and/or a chelated gadolinium.

DRAWINGS

The present invention will be better understood if reference is made to the accompanying drawings, in which:

FIG. 1 depicts a scanning electron micrograph of GdPO4-containing precipitate.

FIG. 2 is a spectrogram of X-ray counts as a function of energy in kiloelectron volts. Element symbols are associated with the peak associated with that element. O=oxygen, C=carbon, P=phosphorous, and Gd=gadolinium.

FIG. 3 is a FTIR spectrogram of absorbance as a function of wavelength. The upper panel depicts the FTIR profile of GdPO4. The lower panel depicts the FTIR profile of chromium (III) phosphate, hydrate.

FIG. 4 depicts a scanning electron micrograph of GdI3-containing precipitate.

FIG. 5 is a spectrogram of X-ray counts as a function of energy in kiloelectron volts. Element symbols are associated with the peak associated with that element. I=iodine and Gd=gadolinium.

FIG. 6 is a FTIR spectrogram of absorbance as a function of wavelength. The upper panel depicts the FTIR profile of GdI3-containing precipitate. The lower panel depicts the FTIR profile of cobalt (II)-EDTA metal-chelate.

FIG. 7 depicts a scanning electron micrograph of GdI3-containing precipitate.

FIG. 8 is a spectrogram of X-ray counts as a function of energy in kiloelectron volts. Element symbols are associated with the peak associated with that element. I=iodine, C=carbon, Na=sodium, and Gd=gadolinium.

DETAILED DESCRIPTION

Figure 1:
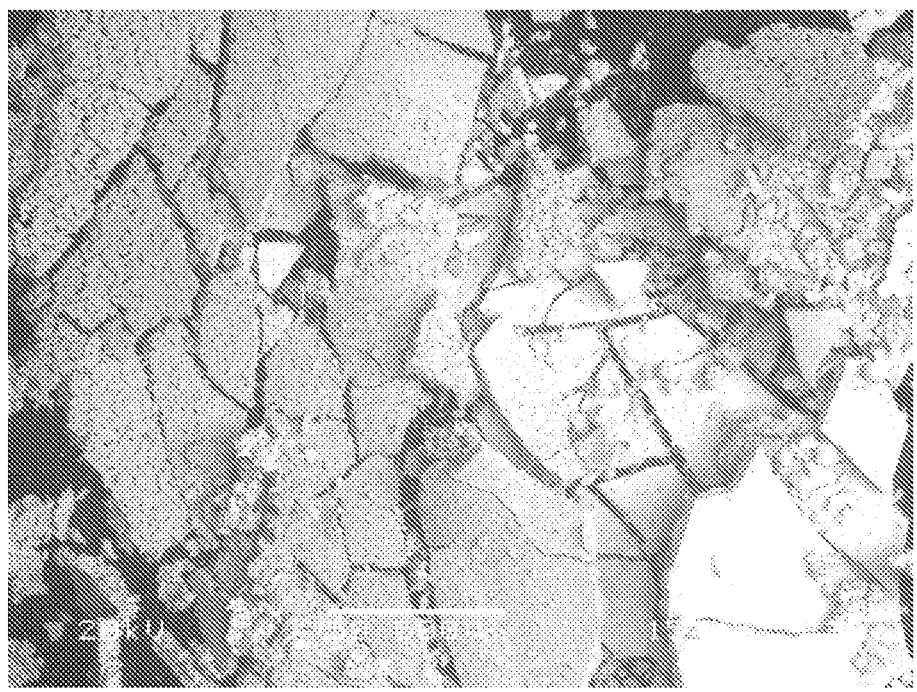

As used herein, the term "about" means nominal value±20% (i.e., 0.2×) inclusive. For example, about 10 mL means 10 mL±2 mL or 8 mL–12 mL, or 8 mL, 9 mL, 10 mL, 11 mL, or 12 mL and all fractions in between.

stream processing. Thus, in some embodiments, residual amounts (hold up, remainder, and/or expired product) of contrast media are pooled to produce a volume of rare-earth-containing compound solution.

As used herein, contrast media generally means magnetic resonance imaging (MRI) contrast agents that are used to enhance the visualization of internal structures in a patient or other subject. The most commonly used MRI contrast agents are gadolinium-based compounds. Examples of gadolinium-based contrast media useful in the practice of this invention include, but are not limited to, those depicted in Table 1. Gadolinium-based contrast agents are considered to relatively unstable and are therefore used within a short-given amount of time after opening the container before discarding any remainder or hold-up residue.

TABLE 1

| Name | Structure | Brands | Package volume |
| --- | --- | --- | --- |
| Gadoterate | Gadolinium (Gd$^3$+) chelated with 1,4,7,10-Tetraazacycl ododecane-1,4,7,10-tetraacetic acid (DOTA) | Dotarem Clariscan | 5 mL or 10 mL in 10 mL vial; 15 mL or 20 mL in 20 mL vial; 10 mL, 15 mL, 20 mL pre-filled syringe. |
| Gadodiamide | Gadolinium (Gd$^3$+) chelated with 2-[bis[2-(carboxylatomethyl-(methylcarbamoylmethyl)amino)ethyl]amino]acetate; gadolinium(+3) cation | Omniscan | 5 mL in 10 mL vial, 15 mL in 20 mL vial, 10 mL in 20 mL pre-filled syringe, 15 mL in 20 mL pre-filled syringe. |
| Gadobenate | Gadolinium (Gd$^3$+) chelated with (4-carboxy-5,8,11-tris(carboxymethyl)-1-phenyl-2-oxa-5,8,11-triazatridecan-13-oic acid (BOPTA) | MultiHance | 50 mL and 100 mL glass bottles. |
| Gadopentate | Gadolinium (Gd$^3$+) chelated with diethylenetriaminepentacetate (DTPA) | Magnevist, Magnegita, Gado-MRT ratiopharm | 50 mL and 100 mL glass bottles. |
| Gadoteridol | Gadolinium (Gd$^3$+) chelated with 10-(2-hydroxy-propyl)-1,4,7,10-tetraazacyclododecane-1,4,7-triacetic acid | ProHance | 5 mL in 15 mL vial, 10 mL in 30 mL vial, 15 mL in 30 mL vial, 20 mL in 30 mL vial, 10 mL in 20 mL pre-filled syringe, 17 mL in 20 mL pre-filled syringe. |
| Gadofoveset | trisodium-{(2-(R)-[(4,4-diphenylcyclohexyl) phosphonooxymethyl]-diethylenetriaminepentaacetato)(aquo) gadolinium(III) | Ablavar (Vasovist) | 10 or 15 mL single-use vials |
| Gadoversetami de | 8,11-bis(carboxymethyl)-14-[2-[(2-methoxyethyl)amino]-2-oxoethyl]-6-oxo-2-oxa-5,8,11,14-tetraazahexadecan-16-oato(3−)] gadolinium III | OptiMARK | 50 mL in 50 mL glass bottle. |
| Gadoxetate | (4S)-4-(4-Ethoxybenzyl)-3,6,9-tris(carboxylatomethyl)-3,6,9-triazaundecanedioic acid, gadolinium III complex, disodium salt | Primovist, Eovist | 10 mL single-dose vials filled with 10 mL. |
| Gadobutrol | Gadolinium (Gd$^3$+) chelated with dihydroxy-hydroxymethylpropyl-tetraazacyclododecane-triacetic acid (butrol) | Gadavist | 7.5 mL, 10 mL, and 15 mL single dose vials; 7.5 mL, 10 mL, and 15 mL single dose pre-filled syringes. |

Disclosed is a method of purifying a metal such as, e.g., a rare-earth element, which includes lanthanide series elements, from medical waste, including expired MRI contrast media and any residue left in a container ("contrast media remainder"). The rare-earth element is usually found as part of a compound or complex and in a solution ("rare-earth element solution"). In some cases, the rare-earth element solution is of sufficient volume and concentration to allow direct purification from a single container. In other cases, multiple contrast media remainders are pooled to provide sufficient amounts of rare-earth element solution for downstream processing.

In some embodiments, the residual amounts of the rare-earth element solution from two or more containers are pooled to form a residual solution, which contains (i) compound comprising a rare-earth element, (ii) optionally an excipient, and (iii) water for injection. The rare-earth element is then extracted from said residual solution.

Metal Chelates

In some embodiments, the rare-earth element is selected from the group consisting of gadolinium, yttrium, samarium, thulium, and lutetium. In some embodiments, the rare-earth element, usually in the form of an ion, is chelated. Examples of useful chelators are listed in table 1 and also include 2-[bis[2-[carboxylatomethyl-[2-(methylamino)-2-oxoethyl]amino]ethyl]amino]acetate, 1,4,7,10-Tetraazacyclododecane-1,4,7,10-tetraacetic acid, 10-(2-hydroxy-propyl)-1,4,7,10-tetraazacyclododecane-1,4,7-triacetic acid, tricalcium; 2-[4,7-bis(carboxylatomethyl)-10-(2-hydroxypropyl)-1,4,7,10-tetrazacyclododec-1-yl]acetate, diethylenetriamine pentaacetic acid bismethoxyethylamide, 0-[(1SR,2RS)-2,3-dihydroxy-1-hydroxymethylpropyl]-1,4,7,10-tetraazacyclododecane-1,4,7-triacetic acid, 2-(R)-[(4,4-diphenylcyclohexyl) phosphonooxymethyl]-diethylenetriaminepentaacetate, and 2-[[(2R)-2-[bis(carboxymethyl)amino]-3-[(4,4-diphenylcyclohexyl)oxyhydroxyphosphoryl]oxypropyl]-[2-[bis(carboxymethyl)amino]ethyl]amino]acetic acid. In some embodiments, the residual solution contains a buffer, or more specifically a polyol with buffering capacity, such as (1-deoxy-1-methylamino)-D-glucitol and/or 2-amino-2-hydroxymethyl-propane-1,3-diol.

In certain specific embodiments, the residual solution contains a gadolinium ion or compound such as gadoteric acid, gadodiamide, gadobenic acid, gadopentetic acid, gadopentetic acid dimeglumine, gadocoletic acid, gadomelitol, gadoteridol, gadofosveset trisodium, gadoversetamide, gadoxetic acid, and/or gadobutrol.

In one embodiment, the rare-earth element-containing compound represents at least about 40% to about 100%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 96%, at least about 97%, at least about 98%, at least about 99%, or at least about 100% of the total solids (i.e., the non-solvent portion) of the residual solution.

In some embodiments, the container containing the residual solution is a vial, a bottle, or a syringe (i.e., a pre-filled syringe). In one embodiment, the container is a bottle and the bottle has a capacity of about 25 mL to about 500 mL, about 25 mL, about 30 mL, about 35 mL, about 40 mL, about 45 mL, about 50 mL, about 55 mL, about 60 mL, about 65 mL, about 70 mL, about 75 mL, about 80 mL, about 85 mL, about 90 mL, about 95 mL, about 100 mL, about 110 mL, about 120 mL, about 130 mL, about 140 mL, about 150 mL, about 160 mL, about 170 mL, about 180 mL, about 190 mL, about 200 mL, about 220 mL, about 240 mL, about 260 mL, about 280 mL, about 300 mL, about 325 mL, about 350 mL, about 375 mL, about 400 mL, about 425 mL, about 450 mL, about 475 mL, or about 500 mL, or more than 500 mL.

In one embodiment, the container is a vial and the vial has a capacity of about 1 mL to about 50 mL, about 1 mL, about 2 mL, about 3 mL, about 4 mL, about 5 mL, about 6 mL, about 7 mL, about 8 mL, about 9 mL, about 10 mL, about 11 mL, about 12 mL, about 13 mL, about 14 mL, about 15 mL, about 16 mL, about 17 mL, about 18 mL, about 19 mL, about 20 mL, about 21 mL, about 22 mL, about 23 mL, about 24 mL, about 25 mL, about 26 mL, about 27 mL, about 28 mL, about 29 mL, about 30 mL, about 31 mL, about 32 mL, about 33 mL, about 34 mL, about 35 mL, about 36 mL, about 37 mL, about 38 mL, or about 39 mL, about 40 mL, about 41 mL, about 42 mL, about 43 mL, about 44 mL, about 45 mL, about 46 mL, about 47 mL, about 48 mL, about 49 mL, or about 50 mL or more than 50 mL.

In one embodiment, the container is a syringe and the syringe has a capacity of about 1 mL to about 50 mL, about 1 mL, about 2 mL, about 3 mL, about 4 mL, about 5 mL, about 6 mL, about 7 mL, about 8 mL, about 9 mL, about 10 mL, about 11 mL, about 12 mL, about 13 mL, about 14 mL, about 15 mL, about 16 mL, about 17 mL, about 18 mL, about 19 mL, about 20 mL, about 21 mL, about 22 mL, about 23 mL, about 24 mL, about 25 mL, about 26 mL, about 27 mL, about 28 mL, about 29 mL, about 30 mL, about 31 mL, about 32 mL, about 33 mL, about 34 mL, about 35 mL, about 36 mL, about 37 mL, about 38 mL, or about 39 mL, about 40 mL, about 41 mL, about 42 mL, about 43 mL, about 44 mL, about 45 mL, about 46 mL, about 47 mL, about 48 mL, about 49 mL, or about 50 mL or more than 50 mL.

In one embodiment, the residual amount represents less than or equal to about 50%, less than or equal to equal to about 40%, less than or equal to about 30%, less than or equal to about 20%, less than or equal to about 10%, or less than or equal to about 5% of the volume of the container of that contained the original solution containing the rare-earth element.

Metal/Metal Ion Extraction

The obtained pooled residual solution is subjected to at least one step to purify the rare-earth element or ion or compound of the rare-earth element from the residual solution and/or from the chelator (i.e., extraction step). In one embodiment, the extraction step comprises an ion exchange step. In another embodiment, the extraction step comprises a solvent precipitation step. In another embodiment, the extraction step comprises an acid precipitation step. In another embodiment, the extraction step comprises an alkaline precipitation step. In another embodiment, the extraction step comprises a salt precipitation step.

Acid Extraction and Precipitation

In one embodiment, the metal (e.g., a rare earth metal) is separated from the chelator by lowering the pH of the metal-chelate solution. In one embodiment, the pH is lowered by combining an organic acid with the metal-chelate. Useful organic acids include inter alia formic acid, lactic acid, acetic acid, benzoic acid, and oxalic acid. In another embodiment, the pH is lowered by combining an inorganic acid with the metal-chelate. Useful inorganic acids include inter alia hydrofluoric acid, hydrochloric acid, nitrous acid, nitric acid, sulfurous acid, sulfuric acid, and phosphoric acid.

In one embodiment, the acid is added (i.e., titrated) to the metal-chelate solution to attain a final pH of <5, <4, <3, <2, 1, 0-4, 0-5, 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.32, 3.3, 3.4, 3.5, 3.6, 3.7, 3.8, 3.9, 4, 4.5, 5, or 5.5.

In a preferred embodiment, the metal-chelate solution contains a gadolinium ion chelate. In more preferred embodiments, the metal-chelate solution is a solution of gadoterate or gadobutrol and the acid is an inorganic acid.

In one embodiment, a solution containing a chelate of gadolinium III ion is combined with an inorganic acid, such as phosphoric acid or nitric acid, and titrated to a pH of <1.

In one embodiment, after adding the acid to the metal-chelate, the resultant acidic solution is allowed to sit/react for a time and temperature until a metal salt forms and precipitates from solution. The precipitate is then removed from the liquid phase by filtration, decanting, or other like methods.

In one embodiment, the resultant acidic solution sits/reacts at a temperature of 0° C.-10° C., 5° C.-15° C., 10° C.-20° C., 15° C.-25° C., 20° C.-30° C., 25° C.-35° C., 30°

C.-40° C., 35° C.-45° C., or 40° C.-50° C. In a preferred embodiment, the reaction temperature is 15° C.-30° C., more preferably 20° C.-30° C.

In one embodiment, the resultant acidic solution sits/reacts for >15 minutes, >30 minutes, >45 minutes, >60 minutes, >2 hours, >12 hours, >24 hours, >48 hours, >72 hours, 5 minutes-120 minutes, 15 minutes-120 minutes, 30 minutes-120 minutes, 45 minutes-120 minutes, 60 minutes-120 minutes, 1 hour-12 hours, 12 hours-96 hours, 12 hours-84 hours, 12 hours-72 hours, 12 hours-60 hours, 12 hours-48 hours, 12 hours-36 hours, 12 hours-24 hours, 24 hours-96 hours, 36 hours-84 hours, about 12 hours, about 24 hours, about 36 hours, about 48 hours, about 60 hours, about 72 hours, about 84 hours, or about 96 hours.

In a preferred embodiment, the resultant acidic solution reacts at about 20° C.-30° C. for about 48 hours-96 hours. In a more preferred embodiment, the resultant acidic solution reacts at room temperature for about 72 hours.

In one particular embodiment, concentrated phosphoric acid is added to a gadoterate or gadobutrol solution until the pH is ≤1, ≤0.5, or 0, the solution is allowed to react at 20° C.-30° C. for 48 hours-96 hours until a gadolinium phosphate salt forms and precipitates from the solution. The salt precipitate is recovered by decanting the liquor or by filtering the suspension. In one embodiment the recovered salt is washed with water and dried. In one embodiment, the precipitated fraction contains no detectable metal-chelate. In one embodiment, the yield of Gd recovered is about 40%-50% (mol).

Percent yield of metal (which term includes metal ion) recovered from the metal-chelate is expressed in percent mole. For example, if 100 grams of $GdPO_4$ (MW=252 grams per mole [g/mol]) are recovered from 1 liter of 1 mmol/mL gadobutrol (MW=559 g/mol), then the percent yield by mole is 100%×(100 g/252 g/mol) (1,000 mL×1 mmol/mL)=39.7%. In one embodiment, the percent yield by mole of recovered metal is 10%-100%, 10%-90%, 10%-80%, 10%-75%, 10%-70%, 10%-65%, 10%-60%, 10%-55%, 10%-50%, 10%-45%, 10%-40%, 10%-35%, 10%-30%, 10%-25%, 10%-20%, 25%-75%, 20%-80%, 30%-70%, 40%-60%, about 10%, about 15%, about 20%, about 25%, about 30%, about 35%, about 40%, about 45%, about 50%, about 55%, about 60%, about 65%, about 70%, about 75%, about 80%, about 85%, about 90%, or about 95%.

In one embodiment, the acidified metal-chelate is combined with a salt to promote precipitation of the metal salt. Here, the metal-chelate may be combined with hydrochloric acid to a pH of about 0, then combined with a salt such as, e.g., sodium iodide. The resultant precipitate would contain metal iodide. In one embodiment, the metal-chelate is a gadolinium chelate such as gadobutrol or gadoterate. In one embodiment, the acid is hydrochloric acid. In one embodiment, the salt is sodium iodide.

In one embodiment, the acidified metal-chelate is combined with a salt and then combined with a polar solvent to promote precipitation of the metal salt. Here, the metal-chelate may be combined with hydrochloric acid to a pH of about 0, then combined with a salt such as, e.g., sodium iodide, and then added dropwise into a polar solvent, such as, e.g., acetone or isopropyl alcohol. The resultant precipitate would contain metal iodide. In one embodiment, the metal-chelate is a gadolinium chelate such as gadobutrol or gadoterate. In one embodiment, the acid is hydrochloric acid. In one embodiment, the salt is sodium iodide. In one embodiment, the polar solvent is an aprotic solvent such as, e.g., acetone.

Solvent Precipitation

In another embodiment, the metal-chelate is precipitated with a polar solvent to separate the metal from the chelate and precipitate the uncomplexed metal. In one embodiment, the polar solvent is protic, such as e.g., isopropanol. In another embodiment, the polar solvent is aprotic, such as e.g., acetone.

In one embodiment, the solvent is layered over an aqueous metal-chelate solution and incubated at a temperature for a time to permit the precipitation of free metal or metal ion, which is subsequently recovered by decanting and/or filtering.

In one embodiment, the metal-chelate is a gadolinium-chelate, such as, e.g., gadoterate or gadobutrol and the polar solvent is an aprotic or protic solvent, such as, e.g., acetone or isopropanol.

Useful solvents include any one or a combination of inter alia dichloromethane, N-methylpyrrolidone, tetrahydrofuran (THF), ethyl acetate (EtOAc), acetone, dimethylformamide (DMF), acetonitrile (MeCN), dimethyl sulfoxide (DMSO), propylene carbonate (PC), formic acid, n-butanol, isopropanol (IPA), nitromethane, ethanol (EtOH), methanol (MeOH), and acetic acid (AcOH).

Ion Exchange Extraction

Any ion exchange process that effectively separates the rare-earth element, such as gadolinium or gadolinium ion (e.g., $Gd+^3$) is useful in the execution of the invention. Ion exchange generally involves an exchange of ions between the subject solution (e.g., a $Gd+^3$ ion) and an insoluble solid. The solid may be for example a matrix packed into a column format, in the form of beads readily separated from the liquid phase, or a membrane.

In some embodiments, the pH of the residual solution is lowered to less than the highest pKa of the chelator to facilitate the protonation of at least one of the carboxylic acid groups of the chelator to enable release of metal ion (i.e., Gd+3). In one embodiment, the dissociated metal and chelator solution is dialyzed against water or an acidic buffered solution to facilitate the separation of the metal ion from the chelator. In one embodiment, the dissociated metal-chelator solution is subjected to ion exchange. In another embodiment, the dissociated metal forms a salt that precipitates and is recovered by filtration.

In one embodiment, the ion exchange step employs a sulfonic resin solid phase. In some embodiments, the eluent for ion exchange is alpha hydroxyisobutyrate, an ammonium ethylenediaminetetraacetic acid (EDTA), an hydroxyethylenediaminetriacetic acid (HEDTA), or the like. In another embodiment, the ion exchange step employs an iminodiacetic resin and an ammonium EDTA or $(NH_4)HPO_4$ eluent.

In one embodiment, the rare-earth or lanthanide-series metal ion is recovered as a chloride salt and processed further. In one embodiment, the pH of the eluted solution containing the metal ion is increased (using a buffer or base, such as for example ammonium hydroxide) to enable the formation of a metal hydroxide precipitate that can be further purified by decanting and/or filtering.

In yet another embodiment, the separated metal-chelator solution is subjected to solvent extraction. In one embodiment, the solvent extracting step includes repeated (e.g., at least two cycles) fractional crystallization of the free metal ion. In some embodiments, the crystallization (a.k.a. precipitation of metal-containing compound) is performed using any one or more of carbonate, oxalate, and hydroxide anions associated with an ammonium cation. In one embodiment, the solvent extracting step employs the use of a neutral phosphorous agent, a monoacidic orthophophosphate and phosphate esters, and a primary, secondary, tertiary, and quaternary amine species and an acidic aqueous phase. In one embodiment, the metal-chelate is treated with sodium iodide and subsequently precipitated with a polar solvent, preferably an aprotic polar solvent, more preferably acetone.

Example 1: Acid Precipitation 1 mmol/mL gadobutrol samples were combined with concentrated phosphoric acid until reaching a pH of 0. At 72 hours at room temperature after the addition of the phosphoric acid, white GdPO4 precipitate was observed at the bottom of the sample vial. The GdPO4 was isolated by filtration or decanting, and the gravimetric crude yield of the gadolinium was calculated to be 45% (mol) relative to starting material.

Figure 2:
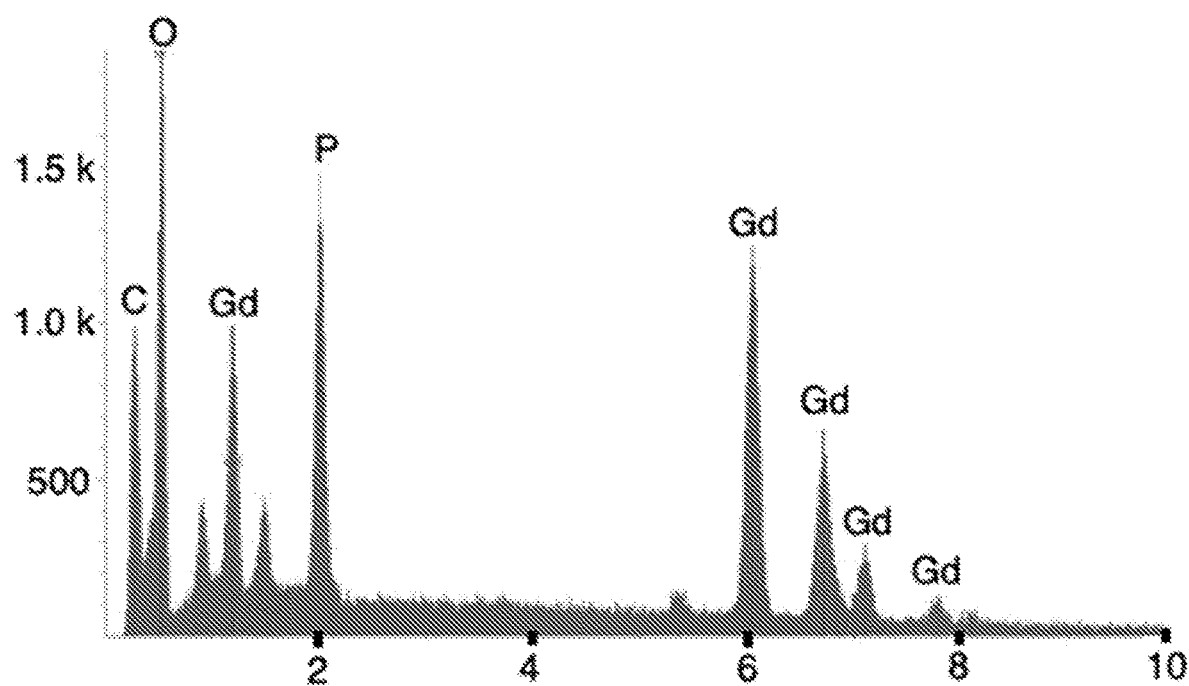

The gadolinium-containing precipitate was subjected to scanning electron microscopy/energy dispersive spectroscopy (SEM/EDS) to confirm that the precipitate contained gadolinium, phosphorous, and oxygen, consistent with GdPO4. FIGS. 1 and 2 depict the scanning electron macrograph and the energy dispersive spectrogram, respectively.

Figure 3:
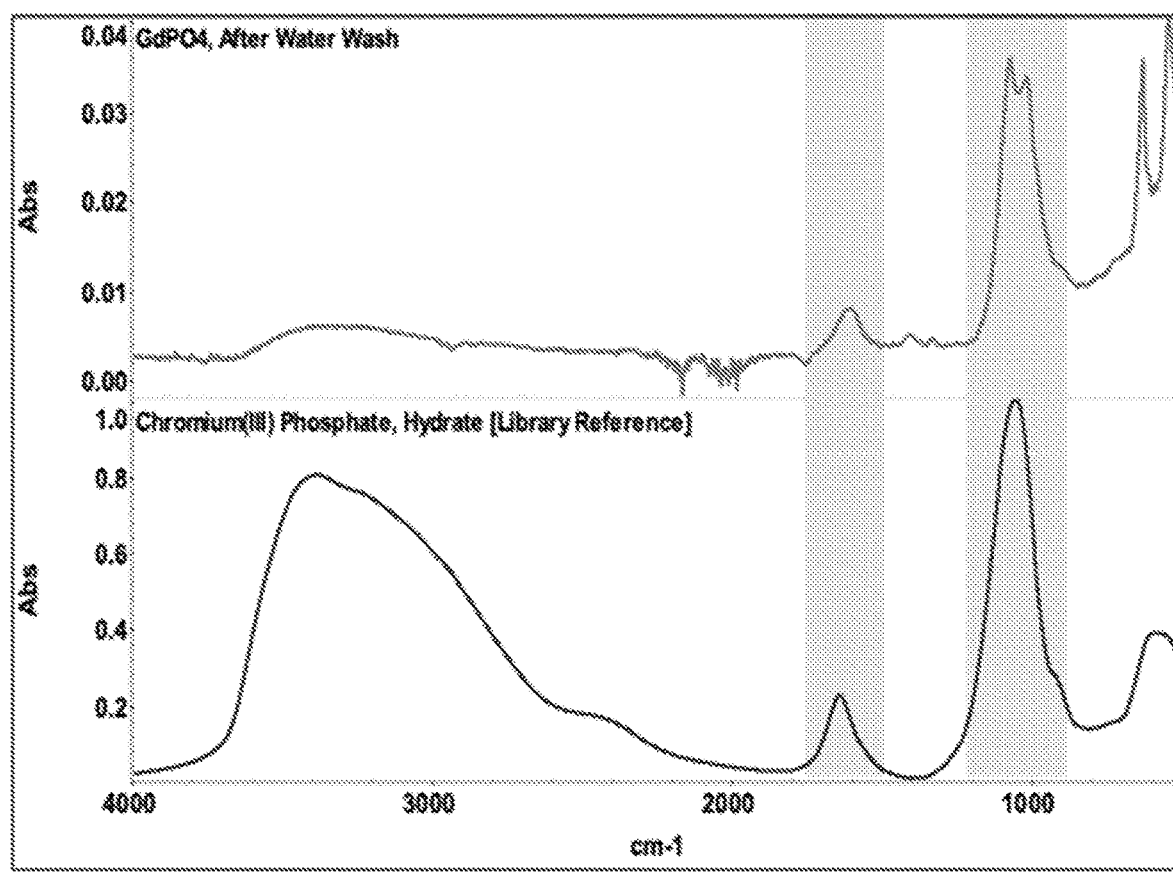

The precipitate was also subjected to Fourier transform infrared analysis (FTIR) to confirm that it was pure inorganic GdPO4. FIG. 3 depicts the FTIR spectrograms of precipitate (GdPO4) (top panel) and CrPQ4(H2O)n (bottom panel) as the library reference standard. Notably, no gadobutrol was detected by FTIR in the isolated precipitate.

Example 2: Low pH Salt Extraction

Concentrated sodium iodide was added to I mmol/mL gadobutrol and adjusted to about pH 0 with hydrochloric acid. The solution turned yellow due to formation of GdI3 At about 72 hours at room temperature, brown crystals were observed at the bottom of the vial. Yield was low (<20% (mol) or a few milligrams GdI3 isolated from 10 mL gadobutrol).

Figure 4:
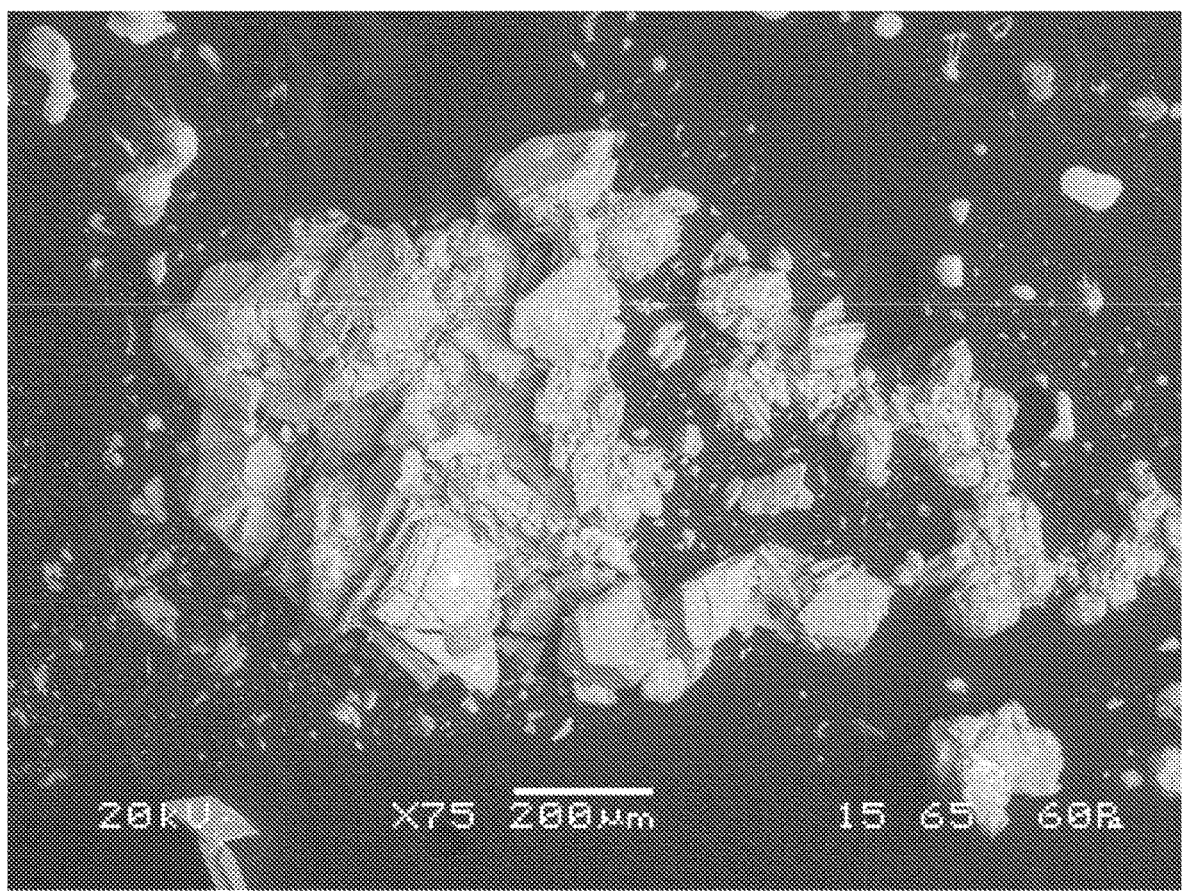
Figure 5:
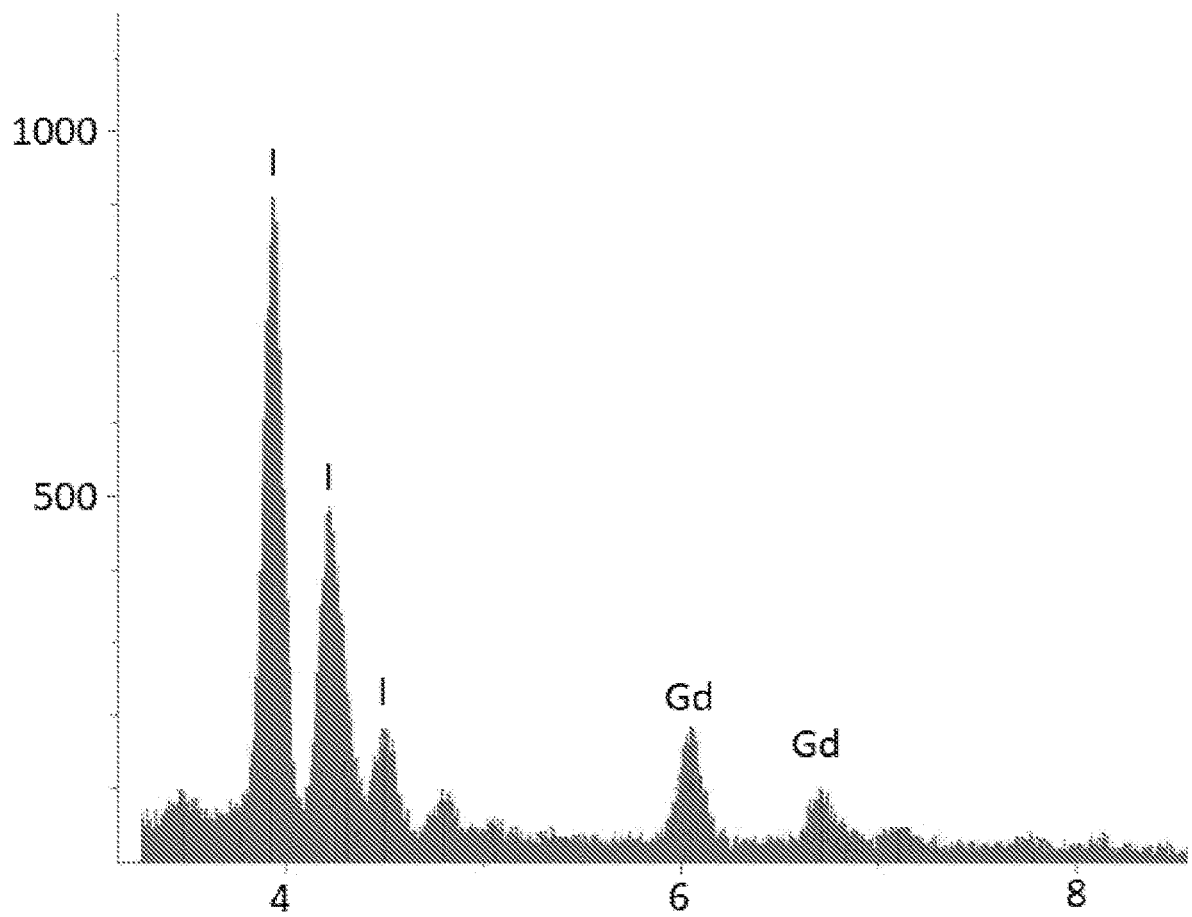

The precipitate was analyzed by SEM/EDS and confirmed to contain gadolinium and iodine (FIGS. 4 and 5).

Figure 6:
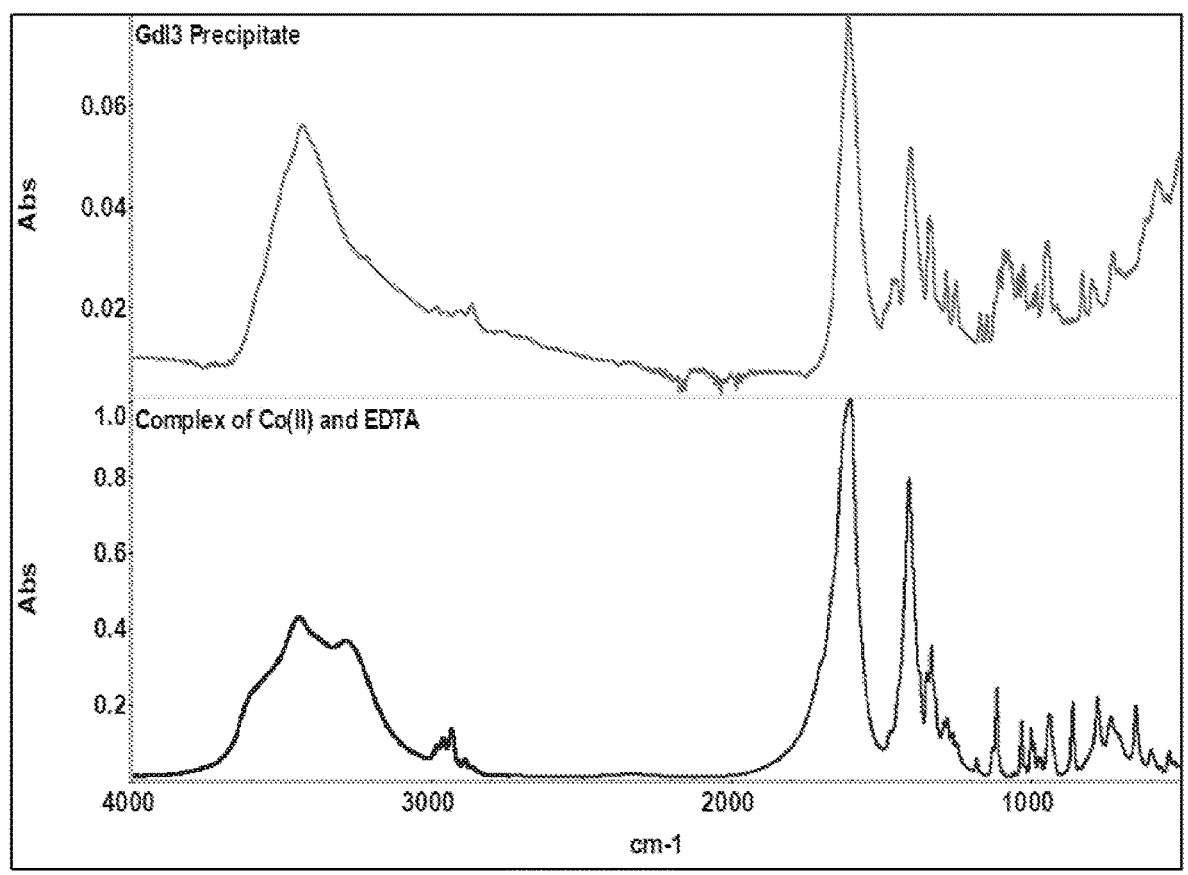

The GdI3-containing precipitate was washed and subjected to FTIR (top panel of FIG. 6) and compared to the FTIR profile of cobalt (II)-EDTA complex (bottom panel of FIG. 6), which is a close representative standard of a similar organic ligand-metal complex. According to the FTIR analysis, it was observed that the GdI3-containing precipitate contained peaks associated with the gadobutrol organic chelator.

Example 3: Low pH Salt Extraction and Solvent Precipitation

Acidified sodium iodide/gadobutrol solution prepared as in Example 2 was added dropwise into acetone. An abundance of precipitate was formed.

Figure 7:
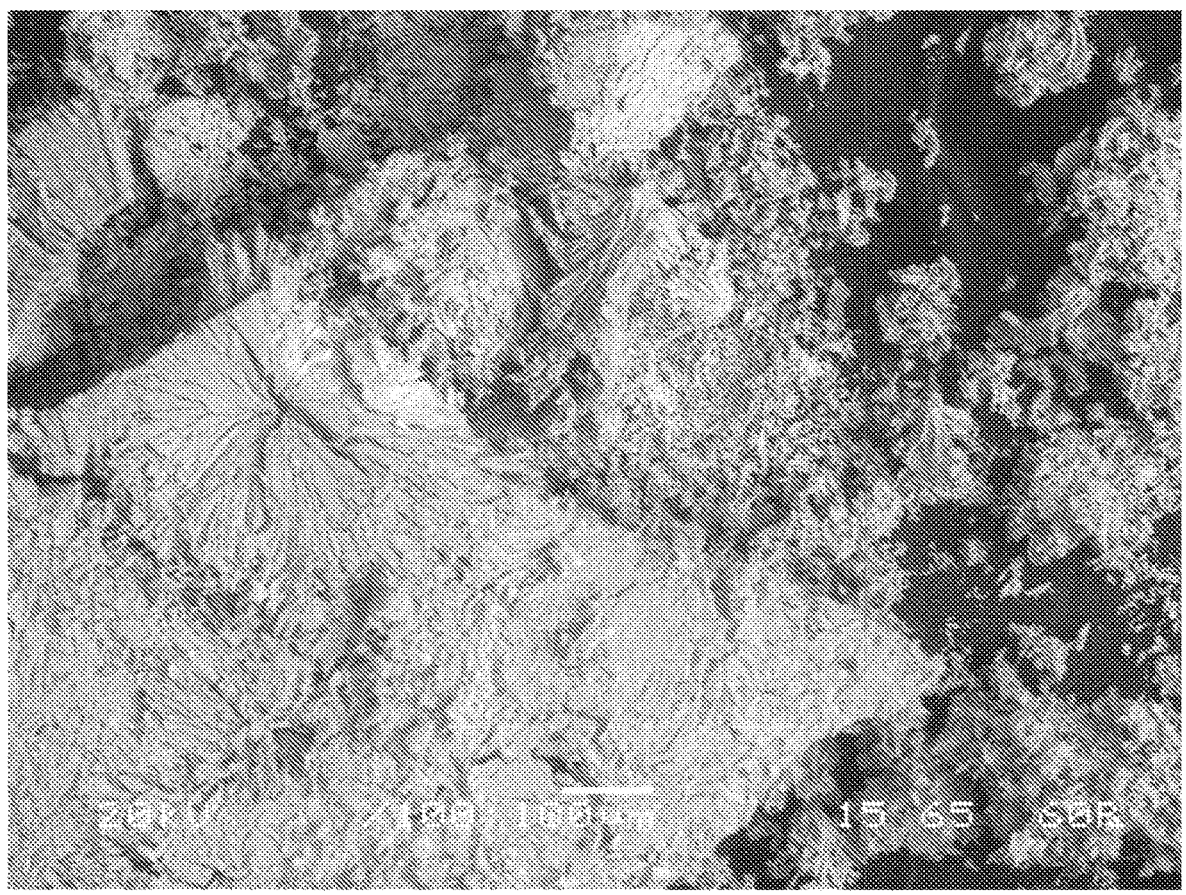
Figure 8:
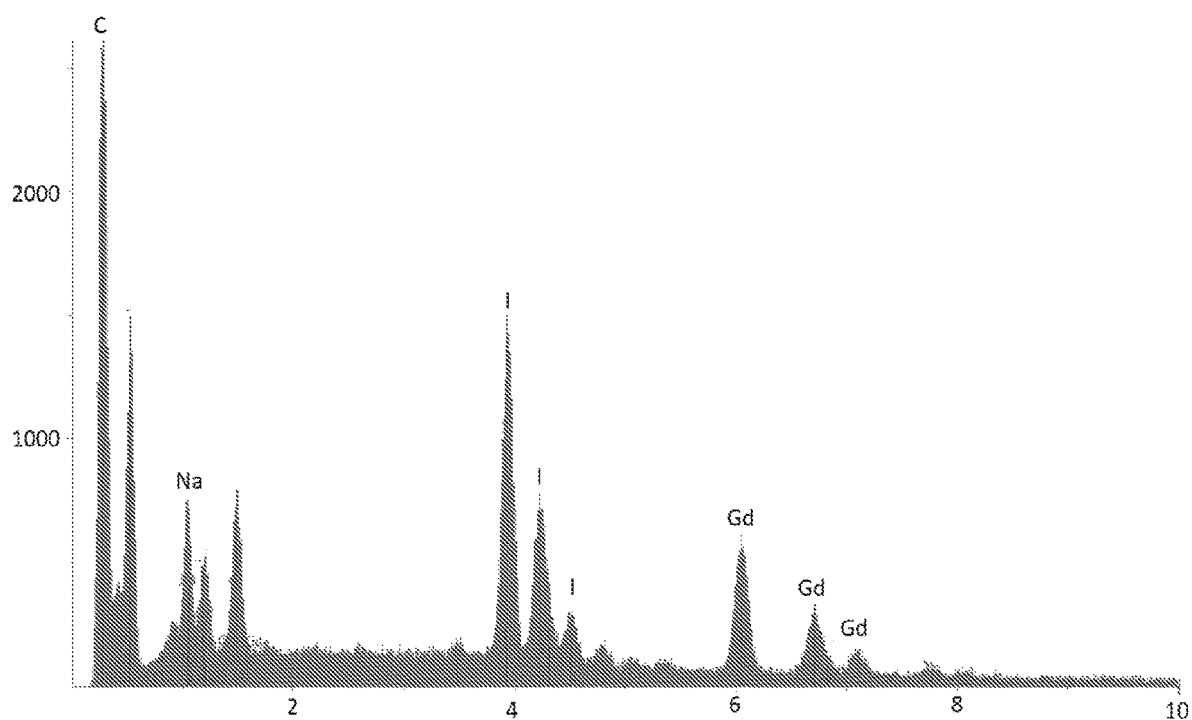

Analysis by SEM/EDS confirmed that the precipitate contained both gadolinium and iodine, but with large quantities of carbon and sodium as shown in FIGS. 7 and 8, indicating the mixed nature of the precipitate.

Example 4: Direct Recrystallization from Acetone

A liquid-liquid bilayer was set up by layering acetone over 1 mmol/mL gadobutrol. After 72 hours at room temperature, a small number of crystals were observed on the vial walls.

Figure 9:
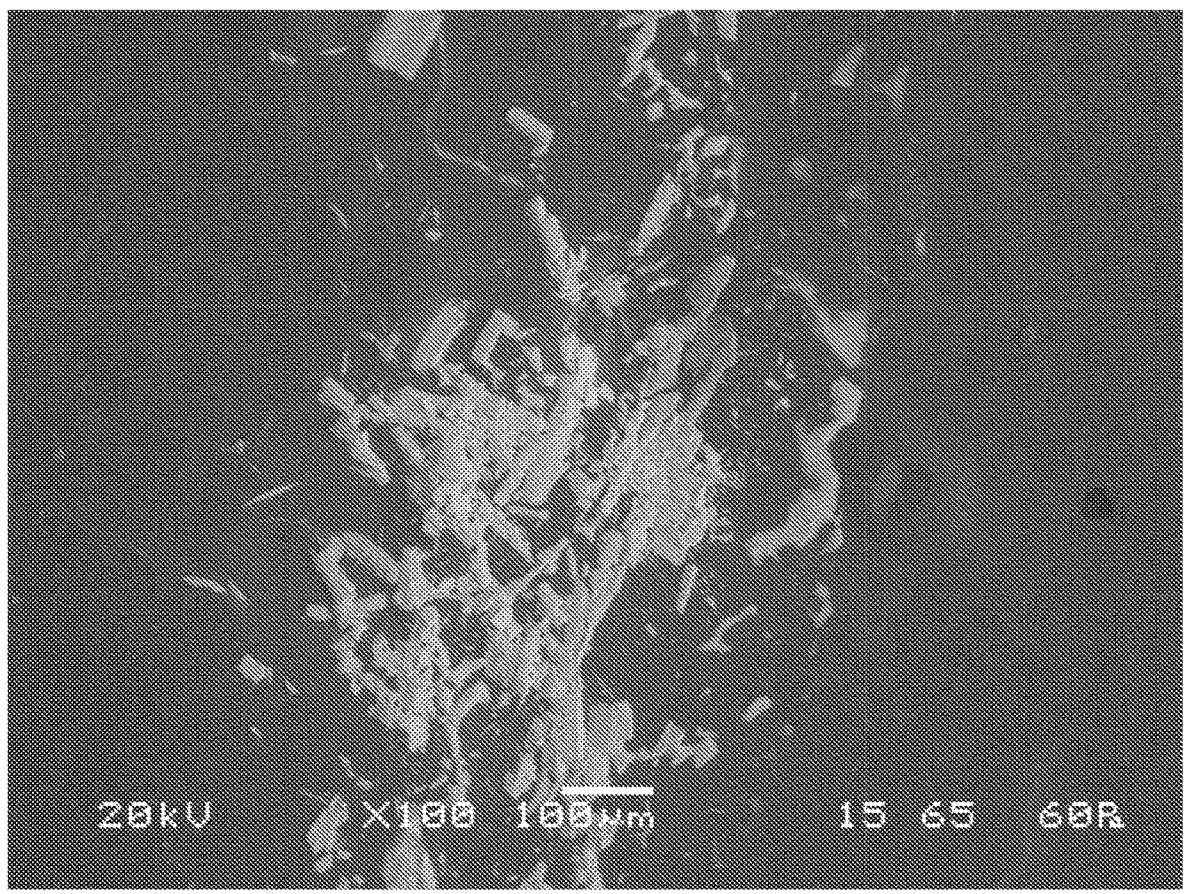
FIG. 9 depicts a scanning electron micrograph of Gd-containing precipitate.
Figure 10:
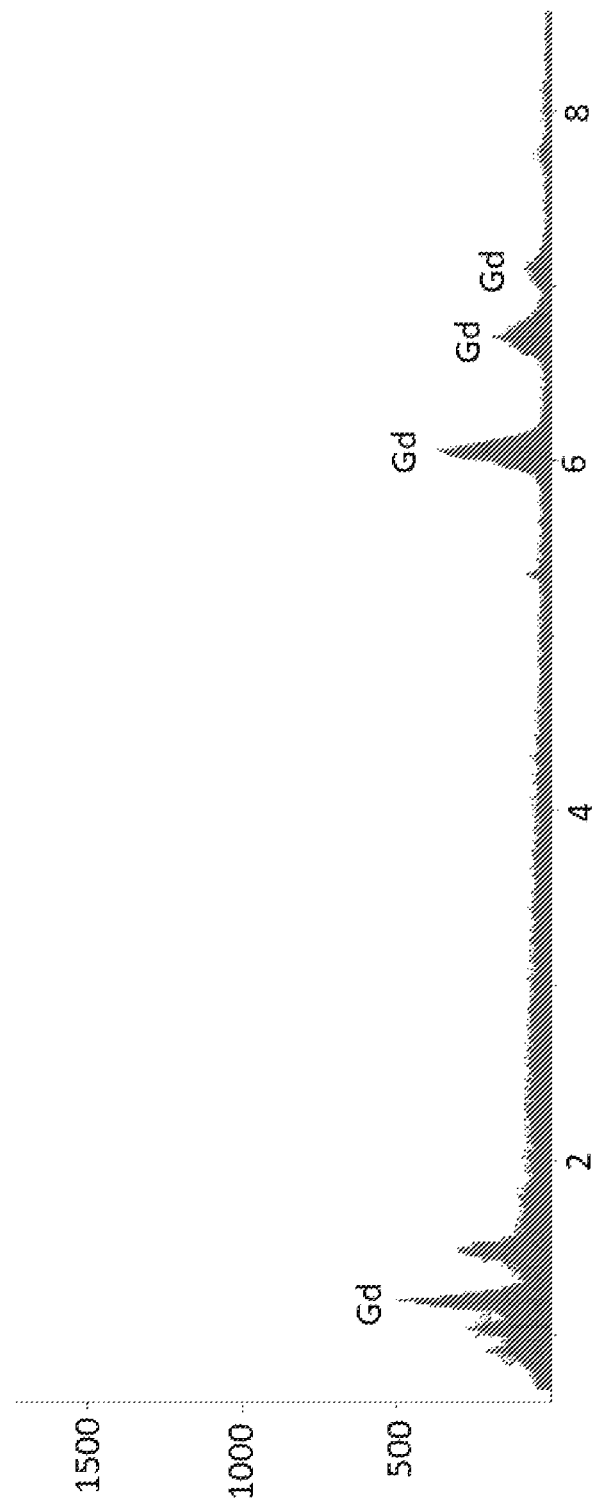
FIG. 10 is a spectrogram of X-ray counts as a function of energy in kiloelectron volts. Peaks associated with gadolinium are labeled Gd.

Crystals were isolated and subjected to SEM/EDS (FIGS. 9 and 10), which confirmed that the crystals contained gadolinium.

Example 5: Direct Recrystallization from Isopropanol

A liquid-liquid bilayer was set up by layering isopropanol over 1 mmol/mL gadobutrol. After 72 hours at room temperature, a small number of crystals were observed on the vial walls.

Figure 11:
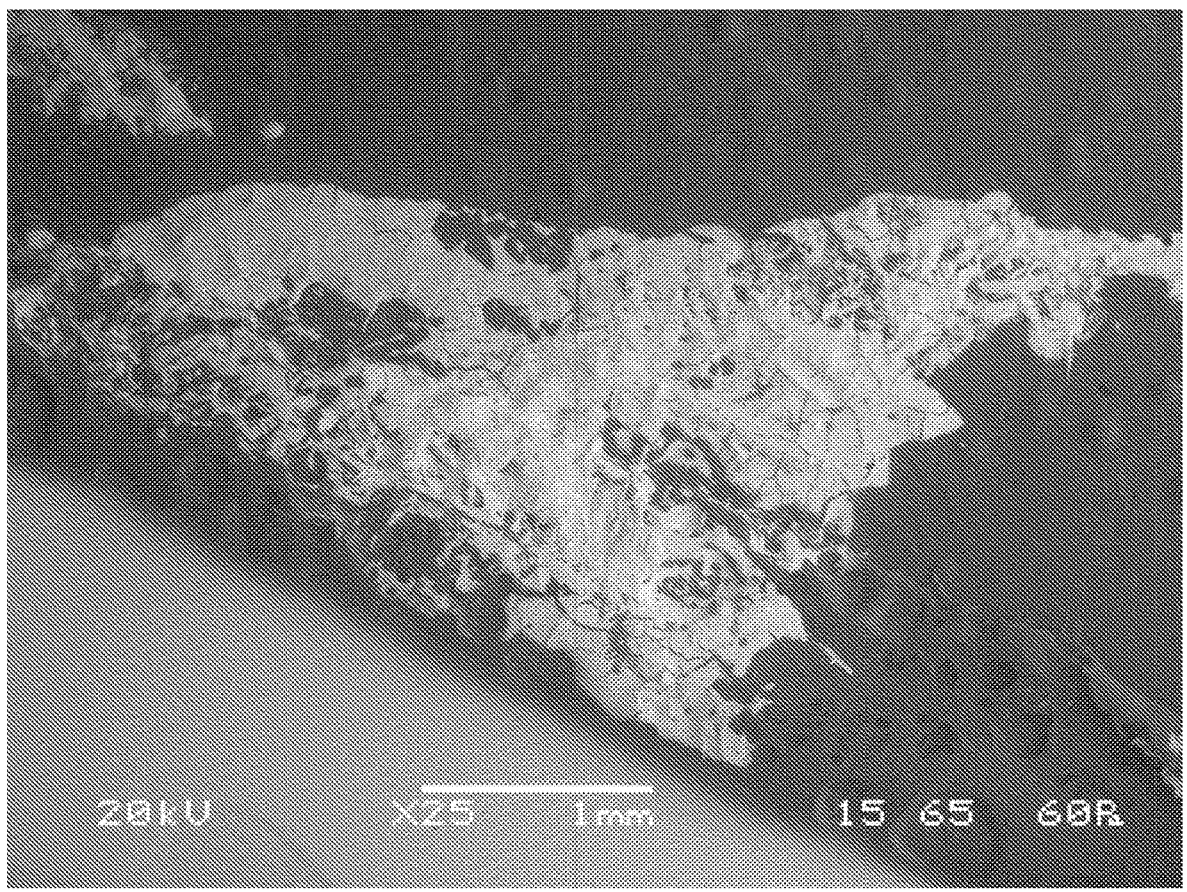
FIG. 11 depicts a scanning electron micrograph of Gd-containing precipitate.
Figure 12:
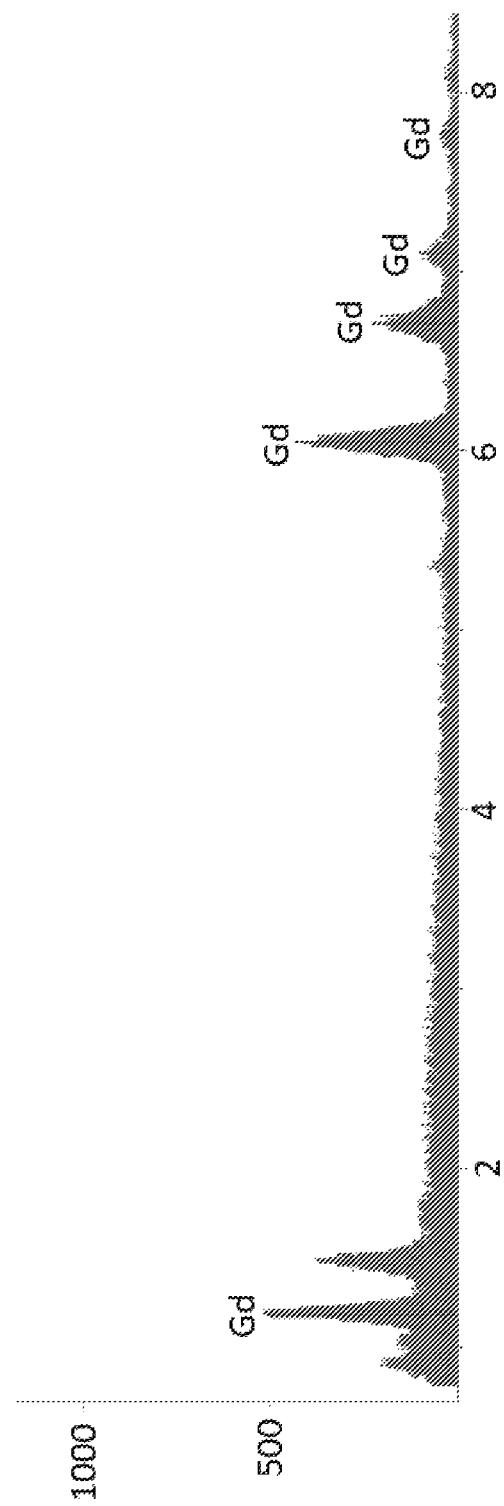
FIG. 12 is a spectrogram of X-ray counts as a function of energy in kiloelectron volts. Peaks associated with gadolinium are labeled Gd.

Crystals were isolated and subjected to SEM/EDS (FIGS. 11 and 12), which confirmed that the crystals contained gadolinium.

While several preferred embodiments of the invention have been disclosed, those of skill in the art will recognize that numerous modifications, enhancements and improvements thereto are possible without departure from the scope of the invention.

What is claimed is:

1. A method of separating a metal of gadolinium from a chelate, the method comprising:
    a. pooling residual amounts of a solution from two or more containers to form a residual solution, wherein said residual solution comprises a (i) compound comprising gadolinium or gadolinium ion and a chelate or polyol, (ii) an excipient, and (iii) water for injection; and
    b. extracting said gadolinium or gadolinium ion from said residual solution comprising a step of forming a gadolinium salt precipitate by reducing the pH of the residual solution to pH<1.

2. The method of claim 1, wherein said excipient comprises a chelator consisting of 0-[(1SR,2RS)-2,3-dihydroxy-1-hydroxymethylpropyl]-l,4,7,10-tetraazacyclododecane-1, 4,7-triacetic acid.

3. The method of claim 1, wherein said gadolinium or gadolinium ion is gadobutrol.

4. The method of claim 1, wherein the container of said two or more containers is a polymer bottle, a glass vial, or a syringe.

5. The method of claim 1, wherein the residual amount of said residual amounts is less than or equal to 50% of the volume of the container of said two or more containers.

6. The method of claim 1, wherein the pH is reduced by combining the residual solution with an acid.

7. The method of claim 1, wherein the step of reducing the pH of the residual solution to pH<1 comprises combining the residual solution with an organic acid.

8. The method of claim 1, wherein the pH is reduced by combining the residual solution with phosphoric acid.

9. The method of claim 1 further comprising the step of combining the reduced pH residual solution with a polar solvent.

10. The method of claim 9, wherein the polar solvent is acetone.

11. The method of claim 1, wherein the residual solution having a reduced pH is incubated at 20° C.-30° C. for 48-96 hours to form the gadolinium salt precipitate.

12. The method of claim 1 comprising the step of removing the gadolinium salt precipitate from the residual solution by filtering the residual solution.

13. The method of claim 1 comprising the step of washing the gadolinium salt precipitate followed by drying the gadolinium salt precipitate.

14. The method of claim 1, wherein said gadolinium ion is a gadolinium III ion complexed with a phosphate counter ion.

15. The method of claim 1, wherein the extracted gadolinium or gadolinium ion represents at least 25% (mol) of the gadolinium or gadolinium ion of said compound comprising the gadolinium or gadolinium ion and the chelate or polyol.

\* \* \* \* \*